United States Patent [19]
Dent

[11] Patent Number: 5,642,358
[45] Date of Patent: Jun. 24, 1997

[54] MULTIPLE BEAMWIDTH PHASED ARRAY

[75] Inventor: Paul W. Dent, Stehag, Sweden

[73] Assignee: Ericsson Inc., Research Triangle Park, N.C.

[21] Appl. No.: 225,399

[22] Filed: Apr. 8, 1994

[51] Int. Cl.$^6$ .................................................. H04B 7/185
[52] U.S. Cl. .......................... 370/323; 455/13.3; 342/51; 370/320
[58] Field of Search ............................. 370/18, 50, 69.1, 370/121, 76, 77, 97, 104.1, 110.1; 455/11.1, 12.1, 13.1, 13.2, 13.3, 7, 54.1; 342/51, 42, 5, 368, 365, 375

[56] References Cited

U.S. PATENT DOCUMENTS

| | | | |
|---|---|---|---|
| 3,678,387 | 7/1972 | Wilson | 455/13.3 |
| 3,710,255 | 1/1973 | Gicca | 455/13.1 |
| 4,232,266 | 11/1980 | Acampora | 455/13.3 |
| 4,956,643 | 9/1990 | Hahn, III et al. | 342/51 |
| 5,081,464 | 1/1992 | Renshaw | 342/375 |

*Primary Examiner*—Wellington Chin
*Assistant Examiner*—Huy D. Vu
*Attorney, Agent, or Firm*—Burns, Doane, Swecker & Mathis, L.L.P.

[57] ABSTRACT

A system for wireless communication between at least one first station and a plurality of second stations using a relay station is disclosed. The relay station contains, among other features, an antenna array and a multi-channel transponder. The antenna array has a plurality of antenna elements which are divided into two sets. The first set is used to provide transmission or reception using beams having a first beamwidth and the second set is used to provide transmission or reception using beams having a second beamwidth. The multi-channel transponder, which is connected to the antenna array and a feeder link antenna, receives feeder link signals from at least one of the first stations and converts the signals into drive signals for the antenna array elements. The multi-channel transponder has a first channel bandwidth for channels transponding signals for transmissions having the first beamwidth and a second channel bandwidth for channels transponding signals for transmissions having said second beamwidth. The plurality of second stations is divided dynamically by a switching system into at least a first group that use the narrowest beamwidth and a second group that use the widest beamwidth, according to the path loss requirements for each group.

44 Claims, 12 Drawing Sheets

5,642,358

MULTIPLE BEAMWIDTH PHASED ARRAY

FIELD OF THE INVENTION

The present invention relates to a radio communications system with increased capacity, and more particularly to a satellite communications system employing a relay station with a phased array of antenna elements which preferably receive signals for each element from a ground station processing unit for retransmission.

BACKGROUND OF THE DISCLOSURE

A full description of satellite and landmobile communications systems employing multiple beam antenna arrays is described in U.S. patent application Ser. No. 08/179,953, which is incorporated herein in its entirety by reference. Briefly, a satellite-mobile communication system will be described with reference to FIG. 1. FIG. 1 illustrates a plurality of portable stations 12 in communication via a satellite 10 with a hubstation 14. The hubstation is connected, for example via a local exchange, to a public switched telephone network (PSTN) to allow calls to be placed between the portable phones and any telephone subscriber worldwide, as well as between the portable phones. The satellite receives signals from the portable phones at a relatively low microwave frequency, such as 1600 MHz. At such frequencies, the transmitters in battery operated phones can be efficient and their antennas can be small and omnidirectional. The satellite translates the received signals from 1600 MHz to a higher frequency for relaying to the hubstation.

In this system, complex instantaneous waveform samples are transmitted to a satellite for retransmission by different antenna elements. The samples for different antenna elements are preferably time-multiplexed onto the In-phase and Quadrature (I and Q) components of a feeder link for transmission from the ground station to the multi-element relaying antenna, or vice-versa. The real parts of the complex element signals are multiplexed onto the I channel, for example, and imaginary parts are multiplexed onto the Q channel. Any inter-sample interference arising due to a feeder link bandwidth restriction is accounted for in the generation of the samples at the ground station processing unit, or, in the reverse direction, is removed by processing at the ground station processing unit. In both cases, the same mathematical operation known as beamforming is used and the beamforming coefficients are chosen to account for intersymbol interference in transmission.

In the known prior art systems, the satellite processes the received signals and retransmits the signals back toward earth in coarse or wide beams. There are two reasons why these systems which only use coarse beams are not always effective, although the total capacity is the same as with the inventive combination of coarse and free beams. When using coarse beams with a capacity of 500 channels wherein each beam reuses the same frequency spectrum, the signals using the same channel frequency must be approximately one coarse beamwidth apart so as to avoid interfering with each other. The second disadvantage of using only coarse beams is that higher transmitter power is required to communicate when using a coarse beam. This is the principal reason for preferring narrower beams, that is, the achievement of high capacity with less total satellite or terminal transmitter power than with coarser beams. However, when using only narrow beams, there must be a larger number of beams to cover the service region and thus, if total capacity is divided between the beams, the capacity per beam is low.

The transmitter power for communications is however reduced. When traffic distributions are not evenly spread but comprise clumps as in major cities, the capacity of a narrow beam may not be enough. Thus, the present invention seeks to provide both the power advantage of narrow beams with the high spot-capacity of large beams to overcome the deficiencies of the prior art.

SUMMARY OF THE DISCLOSURE

According to the present invention, the satellite communications system employs a phased array of antenna elements which preferably receives signals for each element from a ground station processing unit for retransmission. The paths from the ground station processing unit to each element have known phase relationships such that the ground station processing unit can determine the relative phase and amplitude of signals retransmitted by the different elements. The retransmitted signals comprise many independent signals that are multiplexed either in time (TDM), frequency (FDM) or by the use of different spreading codes (CDMA) or a combination of the above. The relative phases of each independent signal's contribution to the radiation from each antenna element may be controlled by the ground processing such that each independent signal is radiated in a desired direction.

The problem solved by the present invention is how best to employ a limited bandwidth for conveying the composite element signals from the ground station to the phased-array satellite transponder using a so-called "feeder link". If the bandwidth of each independent signal is Fo MHz, then the bandwidth of each composite element signal is M·Fo where M is the number of multiplexed signals to be radiated in the same direction. The required feeder link bandwidth to provide full array control flexibility from the ground is then (N·M·Fo), where N is the number of array elements. This flexibility allows M independent signals to be radiated in each of N different directions for a total capacity of N·M signals. The number of signals in any direction, however, is limited to M. To handle clumping of more than M signals in any one direction, the present invention provides an alternative plan with N1 directions and M1 signals in each direction, where $$M1 > M \text{ but } N1 \cdot M1 = M \cdot N \text{ so that the same feeder link bandwidth}$$

is sufficient for either case. Furthermore, the present invention allows simultaneous use of the N·M mode with the N1·M1 mode by sharing a feeder link bandwidth of (N·M+N1·M1)Fo between the two modes, thus handling both an evenly distributed signal traffic floor as well as traffic clumps at the same time.

According to one embodiment of the present invention, a system for wireless communication between at least one first station and a plurality of second stations using a relay station is disclosed. The relay station contains, among other features, an antenna array and a multi-channel transponder. The antenna array has a plurality of antenna elements which are divided into two sets. The first set is used to provide transmission or reception using beams having a first beamwidth and the second set is used to provide transmission or reception using beams having a second beamwidth. The multi-channel transponder, which is connected to the antenna array and a feeder link antenna, receives feeder link signals from at least one of the first stations and converts the signals into drive signals for the antenna array elements. The multi-channel transponder has a first channel bandwidth for channels transponding signals for transmissions having the first beamwidth and a second channel bandwidth for channels transponding signals for transmissions having said second beamwidth. The plurality of second stations is divided dynamically by a switching system into at least a first group that use the narrowest beamwidth and a second group that use the widest beamwidth, according to the path loss requirements for each group.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION OF THE DISCLOSURE

Figure 1:
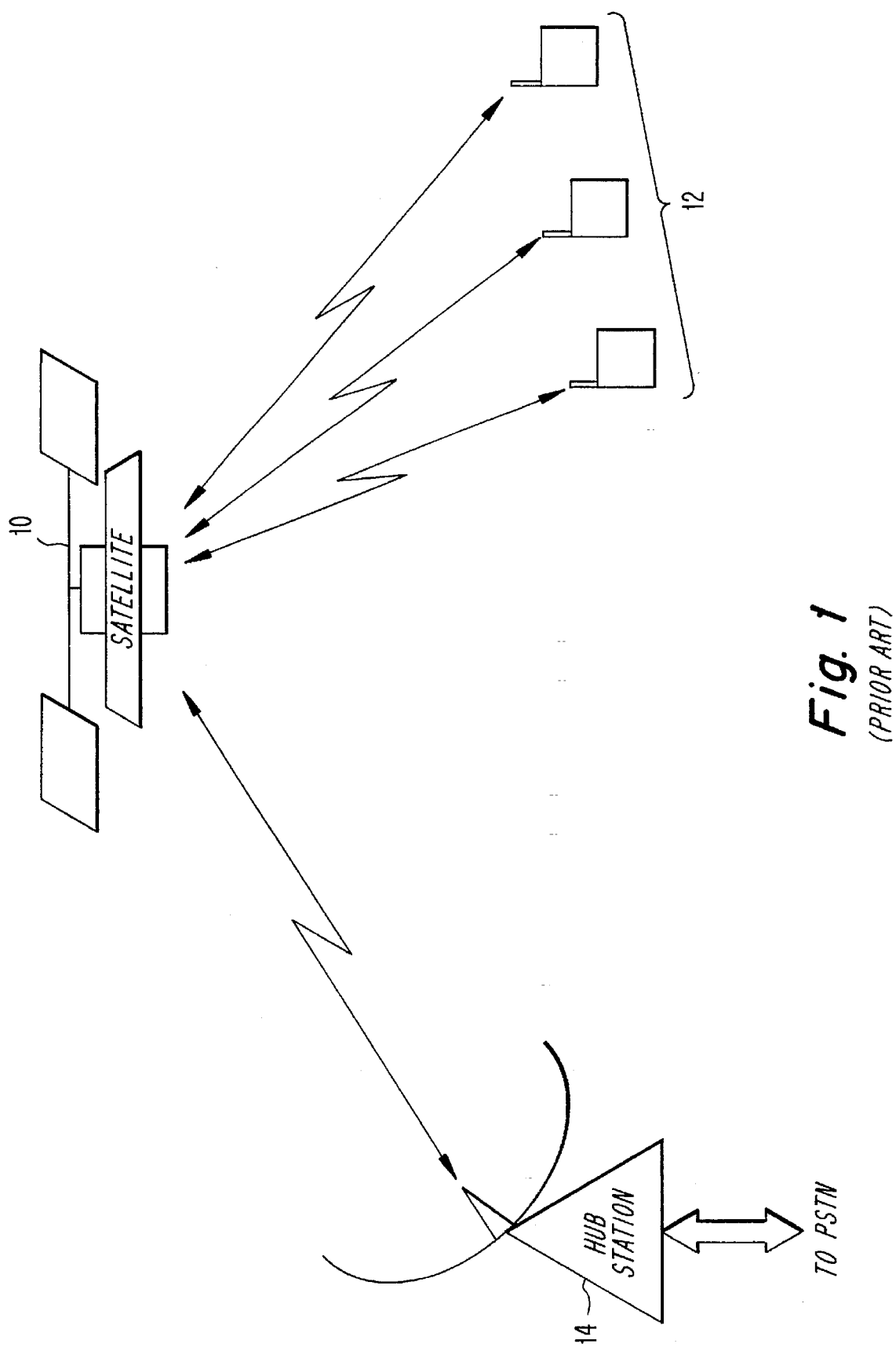
FIG. 1 illustrates a satellite communication system.
Figure 2A:
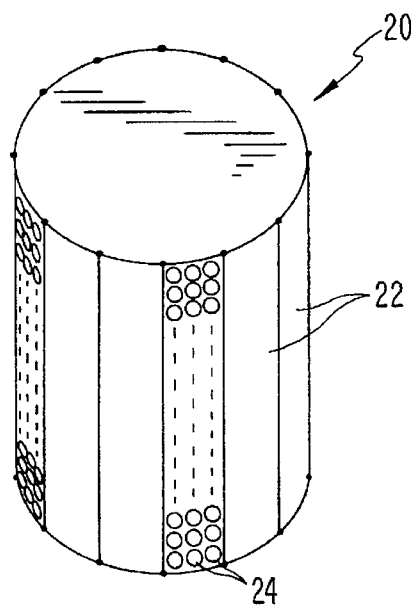
FIGS. 2(a)–(b) illustrate a satellite with a large folding phase array antenna.
Figure 2B:
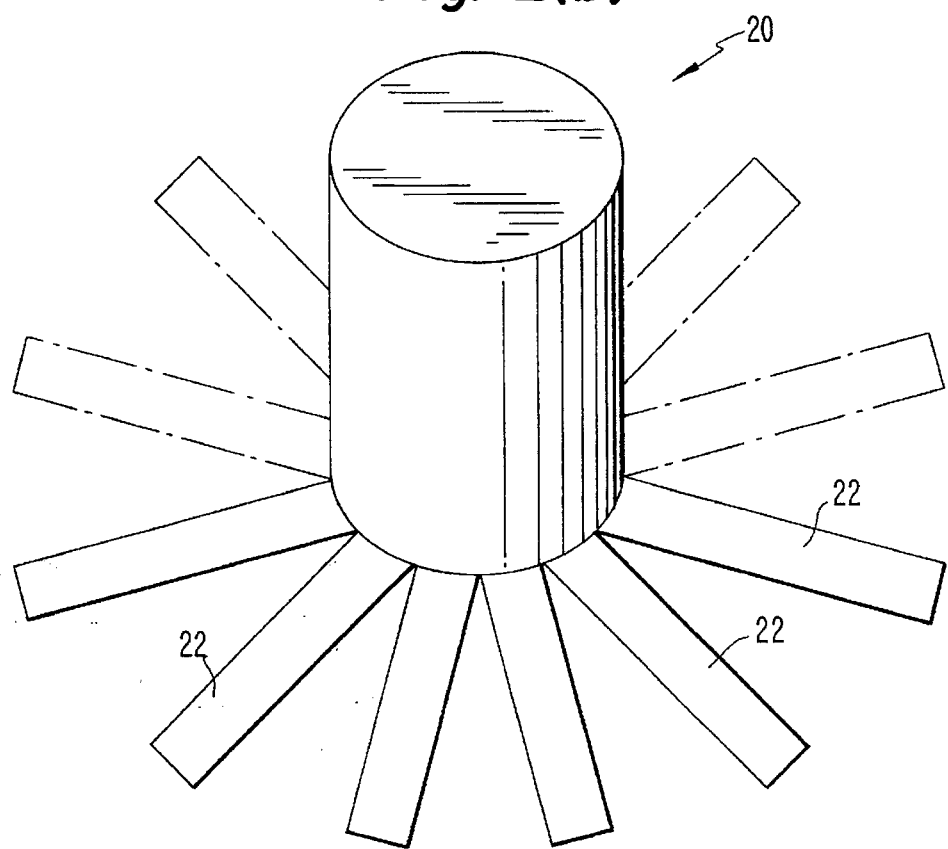

FIGS. 2(a)–(b) illustrate a possible configuration of satellite-borne phased array according to one embodiment of the present invention. As illustrated in FIG. 2(a), in the launch configuration, panels 22 of antenna elements 24 are folded up alongside the body of the satellite 20 to form a multi-faceted structure with L panels with (m×n) elements on each panel that can be accommodated under a rocket nose faring. Once in orbit, the panels are hinged down to form an L-pointed star pattern with a large aperture as illustrated in FIG. 2(b).

Figure 3:
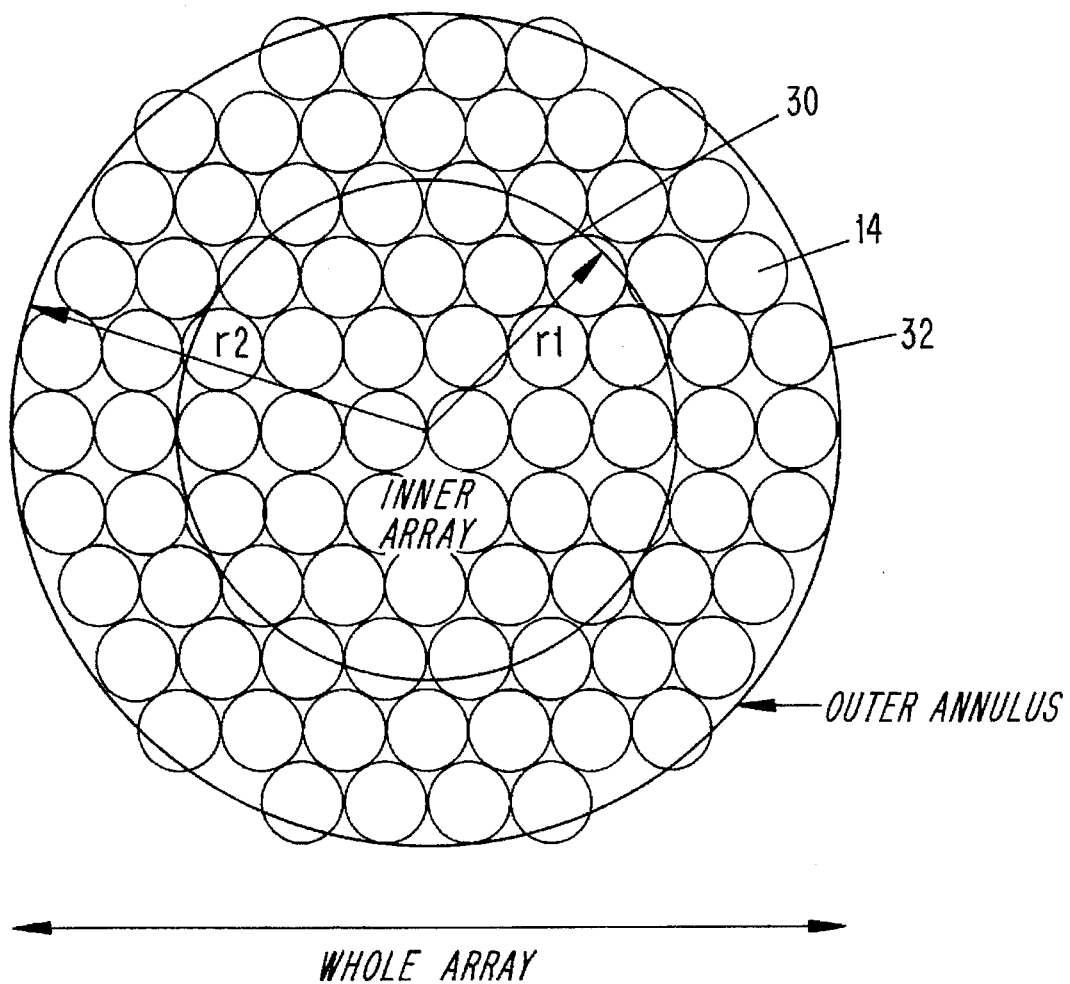
FIG. 3 illustrates an arbitrary division of an array aperture into an inner and outer array.

FIG. 3 illustrates the division of the antenna elements 24 of the array into an inner disc 30 with a radius r1 and an outer disc 32 with a radius r2. When only the elements within the inner disc are excited by receiving a corresponding set of signals over the feeder link, radiation from the array can be directed with a first, coarse angular resolution to form beams of a first beamwidth B1 measured, for example, at the 4 dB down points relative to beam peak. If beams with the first beamwidth B1 are created over the surface of the earth such that they touch at their −4 dB down points, the earth is covered by a total of n1 beams represented by the larger circles 40 illustrated in FIG. 4.

The n1 beams may each carry M1 independent signals in their respective directions if the bandwidth used in each beam is (M1·Fo), where Fo is the bandwidth of each independent signal, and if the number of elements N1 in the inner disc that are independently controlled over the feeder link is equal to or greater than n1. As a result, the total capacity provided is (n1·M1) signals and the total feeder link bandwidth used is (N1·M1·Fo) MHz.

Alternatively, if all the elements within the outer radius r2 are excited, including the elements within the inner radius r1, radiation from the whole array can be directed with a finer angular resolution to form beams of a second, narrower beamwidth B2. This requires a greater number n2 of these narrower beams, touching at their −4 dB points, to cover the earth, where $$n2:n1=r2^2:r1^2$$

Each of these beams may carry M2 independent signals providing the bandwidth of the excitation of each element, which is equal to the bandwidth of each beam, is (M2·Fo), and providing that the number of independently controlled elements N2 in the whole array is equal to or greater than n2. The total capacity provided in this second mode is (n2·M2) signals and requires a total feeder link bandwidth of (N2·M2·Fo) MHz.

Figure 5B:
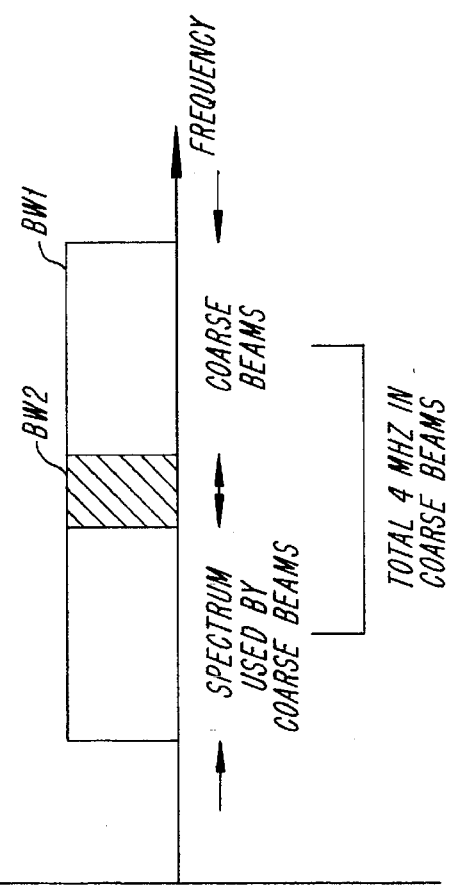
FIGS. 5(a)–(b) illustrate exemplary spectral allocation for coarse and fine beams.
Figure 5A:
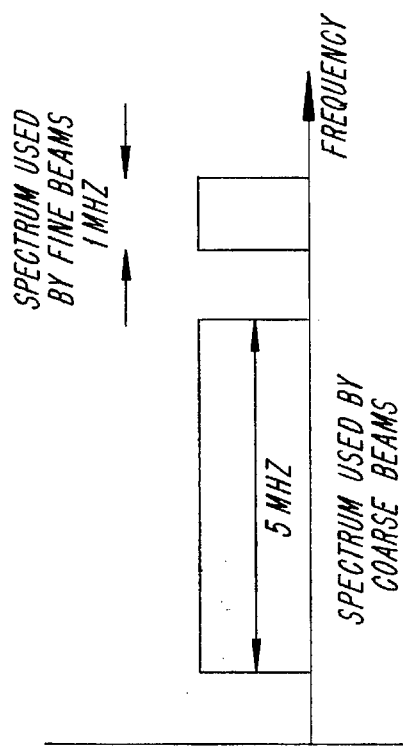

It is possible to excite both of the above modes simultaneously. For example, the elements of the outer disc may be excited with signals with a bandwidth of (M2·Fo) for the second mode while the elements of the inner disc may be excited by signals with a bandwidth of (M2·Fo) to complete the excitation of the second mode and by signals with a bandwidth of (M1·Fo) to excite the first mode. As illustrated in FIGS. 5(a)–(b), the first and second bandwidths can either overlap or not overlap. If the first and second bandwidths are non-overlapping, the total excitation bandwidth of the inner elements is then (M1+M2)·Fo. The bandwidths can also be overlapping as shown in FIG. 5(b). The narrower bandwidth BW2, which normally is chosen to correspond to the narrow beams, is contained within the wider bandwidth BW1. In this embodiment, the signals corresponding to the narrow beam mode can use the bandwidth BW2 while signals corresponding to the coarse beam mode use the remaining BW1-BW2 of bandwidth on either side of the bandwidth BW2.

Consider the following numerical example:

| | |
|---|---|
| Individual signal bandwidth Fo | 10 KHz |
| Bandwidth BW2 | 1 MHz |
| Bandwidth BW1 | 5 MHz |
| Radius ratio r2:r1 | 2:1 |
| Number of coarse beams n1 | 60 |
| Number of narrow beams n2 = (r2/r1)$^2$ · n1 | 240 |
| Number of independently controlled elements in inner ring N1 | 60 |
| Number of independently controlled elements N2 in whole array | 240 |
| Number of signal in each of the narrow beams (BW2/Fo) = 100 | |
| Number of signal in each of the coarse beams (BW1 − BW2)/Fo = 400 | |
| Total capacity = 60 × 400 + 240 × 100 = 48000 signals. | |
| Total feeder link bandwidth = n1 × 5 MHz + (n2 − n1) × 1 MHz = 480 MHZ | |

It may be noted that the total feeder link bandwidth (480 MHz) is simply equal to the total signal capacity (48000) multiplied by the bandwidth per independent signal (10 KHz), at least for this example where n1=N1 and n2=N2. Thus, there is no claimed total capacity advantage in having both a coarse and a fine beam mode. However, the two beamwidths can better handle uneven traffic distributions across the surface of the earth.

Figure 4:
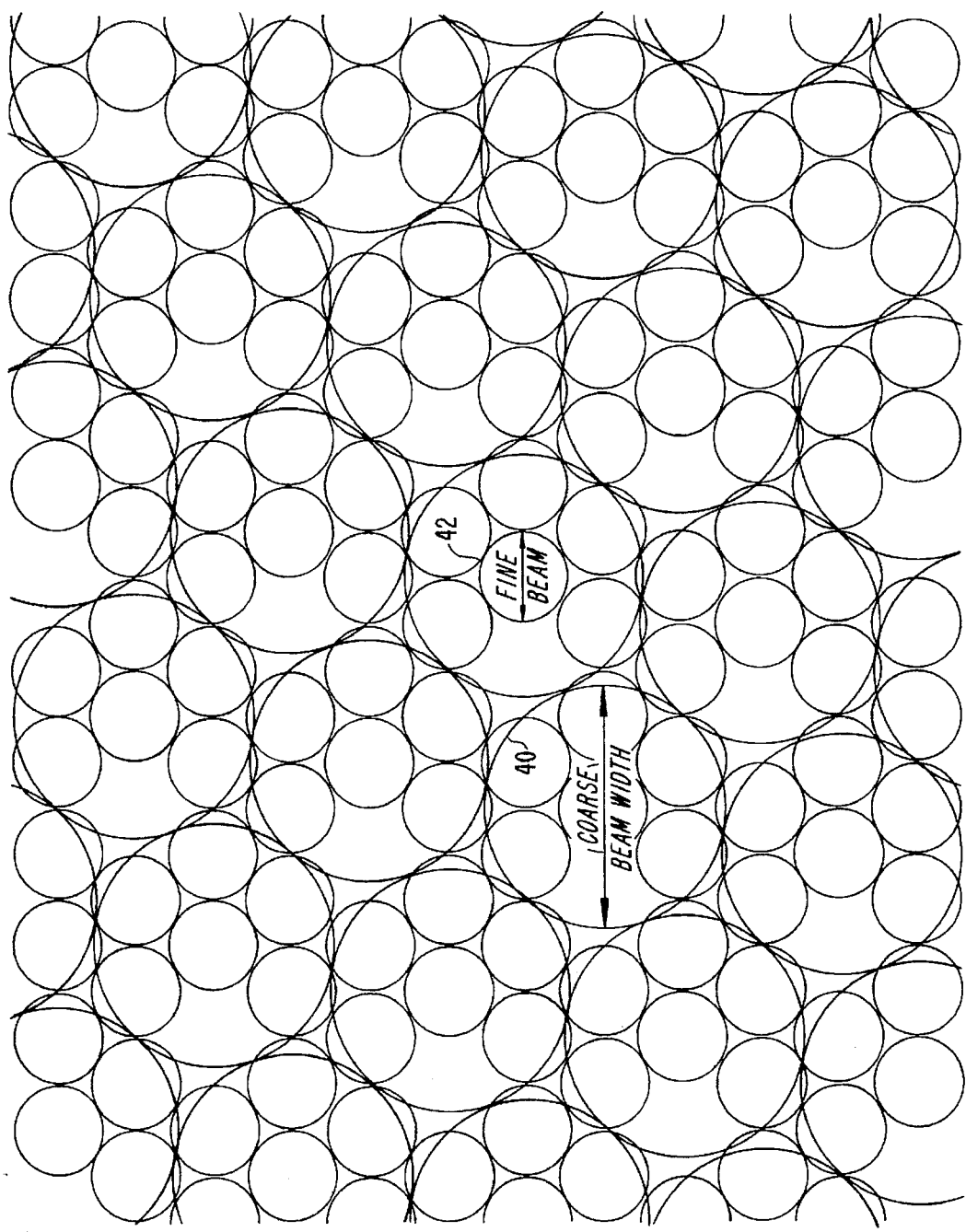
FIG. 4 illustrates an exemplary coverage using large and small beams.

Now consider the capacity distribution handled by only the smaller beams illustrated by the small circles 42 in FIG. 4. Each smaller circle 42 can contain up to, for example, 100 signals corresponding to, for example, up to 100 mobile or fixed communication terminals. However, even the small circles may be on the order of hundreds of kilometers in diameter and thus can encompass several cities where the total traffic demand may be greater than 100 signals. If capacity of surrounding small circles is underutilized, it is unfortunately not possible to use the remaining capacity in the area of high demand, since all of the beams use the same frequency, and this would entail using the same frequency spectrum twice in the same beam, which would cause interference. However, the capacity of the overlying coarse beam is equal to, for example, 400, and uses a different part of the frequency spectrum, namely the 4 MHz of the 5 MHz which does not overlap the 1 MHz used by the narrow beams. This capacity may be used anywhere within the four narrow beams overlapped by the single coarse beam, so that at any point a peak traffic demand of 100+400=500 signals may be handled.

As described earlier, the prior art solution of using only coarse beams has several disadvantages. First, the signals using the same channel frequency must be approximately one coarse beamwidth apart so as to avoid interfering with each other. However, this constraint precludes a traffic distribution in which the 500 users in one beam are concentrated in one half of the beam bringing them into close proximity with 500 users concentrated in the opposite half of an adjacent beam. To rectify this situation, the narrower angular resolution of the narrower beams is advantageous. Users that are too close to be discriminated by the coarse beams are thus allocated to the fine beams, thus thinning out the user distribution among the coarse beams to a more uniform level which they can handle. Users that are too close even to be discriminated by the fine beams are allocated separate channel frequencies according to the invention disclosed in U.S. application Ser. No. 08/179,953. Thus, the provision of coarse and fine beams according to the present invention as well as a plurality of channels according to the invention disclosed in U.S. application Ser. No. 08/179,953 adds another degree of freedom which the adaptive channel allocation algorithms can exploit to handle different traffic distributions over the surface of the earth.

The second disadvantage of using only coarse beams is that higher transmitter power is required to communicate when using a coarse beam. This is the principal reason for preferring narrower beams, that is, the achievement of high capacity with less total satellite or terminal transmitter power than with coarser beams. The mobile or fixed terminals can however be sorted into a group that achieves satisfactory signal quality with the wide, low gain beams and a group that needs the narrower, high gain beams. This sorting can be done dynamically by a mobile switching center as the situation changes due to, for example, terminal or satellite movement. The total power needed to excite the coarse- or fine-beam modes may be calculated as follows.

At any one channel frequency fl of bandwidth Fo, a ground terminal needs to receive a certain power flux density of P watts per square meter. The antenna of the ground terminal has an equivalent capture area A1 square meters which captures a signal power PA1, sufficient for good quality communication. The total area jointly illuminated by the N1 coarse beams is simply the area of the earth A2 seen from the satellite. Actually, this area A2 should be calculated as the area normal to the sightline from the ground terminal to the spacecraft, to account for geometrical effects. The relationship between ground area and normalized area for different satellite orbits and minimum elevation angles is given in Table 1.

TABLE 1

AREAS ILLUMINATED FROM DIFFERENT ORBITS kM$^2$ X 10$^6$

GEO = Geostationary 40,000 KM altitude
MEO = Medium 10,000 KM altitude
LEO = Low altitude 2000 KM

| For coverage down to elevation angles of: | area of earth's surface illuminated | | | area A2 normal to the sightline | | |
|---|---|---|---|---|---|---|
| | GEO | MEO | LEO | GEO | MEO | LEO |
| 0 degrees | 221 | 157 | 61 | 105 | 66 | 19 |
| 10 degrees | 117 | 118 | 37 | 101 | 63 | 17 |
| 20 degrees | 137 | 86 | 23 | 91 | 55 | 13 |

The total satellite power needed to illuminate an area A2 with a power flux density of P at fl is thus (P·A2). This power is required for each of the M1 (=400) channels of bandwidth Fo supported in the coarse beams. The total satellite power needed is thus 400·P·A2 divided between the n1=N1=60 array elements of the inner circle, that is 400/60=6.7 power units of (P·A2) each.

The total power needed to illuminate the same area with the same power flux density using the narrow beams is also (P·A2) per channel; but since the number of channels in each narrow beam is only 100, the total power is only 100P·A2 for the same total capacity. It is thus four times more power-efficient to support a traffic channel in a narrow beam than in a coarse beam.

This total power is distributed among the total number (240) of array elements, giving 100/240=0.416 units each. The elements in the inner circle transmit both 6.7 units on the coarse beam frequencies as well as 0.416 units on the narrow beam frequencies, for a total of 7.116 units, while the 180 of the outer annulus transmit only 0.416 units. Full use of the coarse beams consumes ⅘ths of the total satellite power for the same total capacity as provided by the narrow beams which only use ⅕th the total power.

The large relative power ratio of 7.116/0.416=17 may be reduced if the coarse beams do not need to be loaded to full capacity everywhere, that is, if traffic clumps do not occur in every coarse beam. This is a reasonable assumption due to the fact that ⅔rds of the earth's surface is ocean, where almost zero traffic demand exists. Other estimates of the traffic loading of the coarse beams may be made by evaluating cellular mobile telephone coverage patterns.

Cellular operators have clearly directed their investments in infrastructure for those areas that will produce the most revenue, and yet less than 10% of the total land area of the United States is presently covered. This indicates that traffic peaks will arise in less than 10% of the coarse beams over land, that is, in fewer than 1 in 30 altogether. Thus, it is not necessary to provide the total 17 times power dimensioning for the inner elements compared to the outer elements, and a factor as low as 2 to 4 may suffice in practice, depending on a more accurate assessment of the traffic distribution picture. A communications link margin reduced by, for example, 3 dB may also be acceptable in when using coarse beams to serve traffic clumps.

Figure 6:
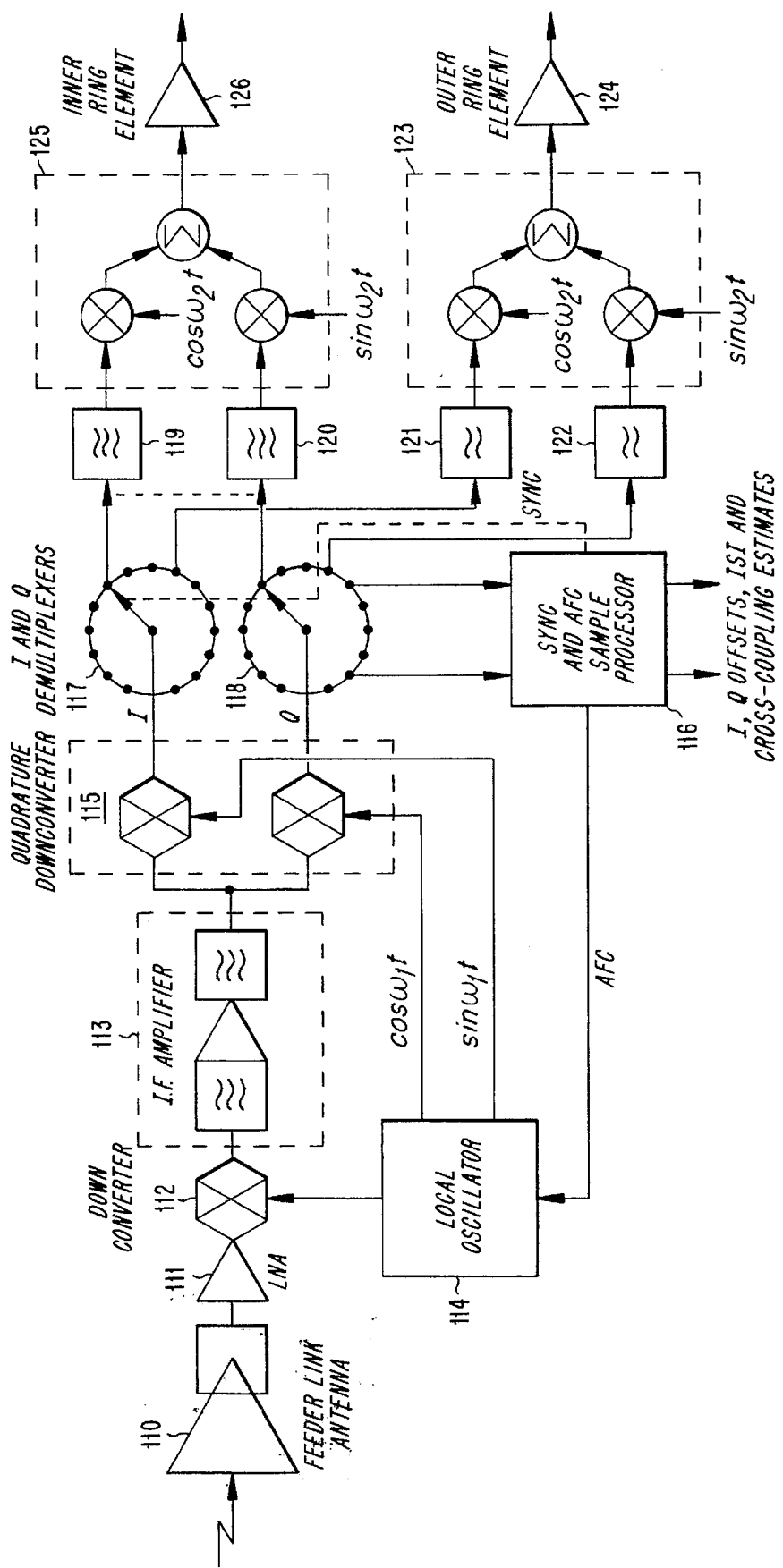
FIG. 6 illustrates a dual-beamwidth phased array transponder according to one embodiment of the present invention.

FIG. 6 shows the block diagram of a coherent transponder suitable for implementing the present invention. A feeder link receive antenna 110 receives time-multiplexer complex samples from the ground station modulated onto, for example, a K-band (20–30 GHz) microwave carrier frequency. The feeder link signal is amplified in a low-noise amplifier 111, downconverted by mixing with a suitable local oscillator frequency from a local oscillator 114 in a downconverter 112 to produce a suitable intermediate frequency signal, which is then filtered and amplified using an intermediate frequency amplifier 113. The filtered and amplified intermediate frequency signal is then converted to I and Q baseband signals using a quadrature downconvertor 115 and local reference signals Cos(W1·t) and Sin(W1·t) from the local oscillator unit 114. The I and Q baseband signals comprise time-multiplexed samples intended for different antenna array elements. These samples may, for example, be denoted $$I1, I2, I3, I4$$

$$Q1, Q2, Q3, Q4$$

and are separated by I,Q demultiplexers 117, 118. Successive samples from the I1 and Q1 output are filtered in low-pass filters 119 and 120 to remove the sampling frequency and to produce smooth waveforms. According to Nyquist's theorem, providing the original I,Q signals of bandwidth BW/2 Hz were each sampled at a frequency of at least BW samples per second, the original I,Q waveforms are completely restored after demultiplexing and low-pass filtering. The restored I,Q waveforms I1(t) and Q1(t) are then upconverted using a quadrature modulator 125 to the desired array transmission frequency, amplified by a power amplifier element 126 and fed to an array element of the inner ring (for example).

Likewise, a signal for an element of the outer ring is demultiplexed and output from the appropriate terminals of the demultiplexers 117, 118, low-pass filtered in filters 121, 122 and upconverted in a quadrature modulator 123 to the transmit frequency. The upconverted signal is then amplified by an outer-ring amplifier element 124 and fed to an outer ring antenna element.

According to the present invention, the bandwidths of the signals driving the inner and outer elements may be different, although overlapping. As a result, different sampling rates should be used in proportion to the bandwidth, according to Nyquist's theorem. It is of course permitted to use the higher sampling rate also for the lower bandwidth signals, but this would be a waste of feeder link bandwidth. Thus, it is desirable that the multiplexing and demultiplexing scheme support a mixture of at least two regular sampling rates.

In the above example, a bandwidth of 5 MHz was used for the inner elements, requiring I and Q sampling rates of 5 megasamples/sec, while the outer elements used a 1 MHz bandwidth for which 1 megasample/sec of I and Q suffices. These different sampling rates may be mixed by connecting 5 regular spaced demultiplexer outputs together for the wideband signals, thus achieving five times the sampling rate. For example, in the example of 180 elements of 1 MHz bandwidth plus 60 elements of 5 MHz bandwidth, a multiplexer and demultiplexer with 5×60+1×180=480 inputs and outputs respectively is needed.

Multiplexer inputs 1, 97, 193, 289 and 385 may be connected together and used for the first of the 60 wideband signals. Inputs 2, 98, 194, 290 and 386 may be used for the second of the 60 wideband signals and so on until inputs 60, 156, 252, 348 and 444 are used for wideband signal number 60. Then input 61 is used for narrowband signal 1, input 62 for narrowband signal number 2 and so on up to 96 for narrowband signal 36; then inputs 157–192 are used for the next 36 narrowband signals and so on giving 180 narrowband signals altogether. In this scheme, the number of multiplexer inputs should be a multiple of the bandwidth ratio (5) to achieve regular sampling of the wideband signals.

Extra multiplexer inputs and demultiplexer outputs (also a multiple of the bandwidth ratio may be added to convey reference signal samples from the ground station to the satellite or vice versa. I,Q reference samples such as (1,0) or (0,1) and (0,0) may be multiplexed into these inputs to assist synchronization and automatic frequency control unit 116 to correct frequency error, synchronize the demultiplexing with multiplexing and estimate imperfections such as quadrature downconvertor DC offsets, intersample interference (ISI) and I,Q cross coupling such that precompensation may be performed to correct these errors in the digital signal processing domain at the ground station.

The power ratio between inner and outer elements is desirably produced using identical power amplifier elements so as more easily to maintain known phase relationships between them. A power ratio of 2 may, for example, be obtained by using a combination of two identical power amplifiers for inner ring elements and one for outer ring elements.

To minimize the feeder link bandwidth used for a given capacity, the number of independently controlled elements should be equal to the number of frequency-reuse beams to be produced. Each such element alone should have a radiation pattern that covers the earth and achieves maximum gain at the edge of the covered region. It is well known that antennas achieve maximum edge gain when they are dimensioned to be 4 dB down at the edge compared to the center. Broadening the beam beyond this level reduces the peak gain faster while fall-off at beam edge is improved, thus worsening the beam-edge gain, while narrowing the beam increases the fall-off at beam edge faster than the peak gain increases, also worsening performance. Nevertheless, there is a loss of 4 dB for creating array beams at the edge of coverage compared to beams in the center. Moreover, more gain is ideally required at earth edge due to the increased slant range. This so-called scan loss can be reduced by shaping the element radiation patterns to have more gain towards the edge and less towards the middle, thus improving the beam edge gain. The shaping can also be deliberately exaggerated to compensate for the increased slant range at the beam edge compared to the beam center. Alternatively, a greater number of elements than beams can be employed at the expense of feeder link bandwidth, and each element pattern can then be wider than earth-coverage such that it is less than 4 dB down at earth edge. In U.S. patent application Ser. No. 08/179,947 entitled "Waste Energy Recovery" which is hereby incorporated by reference, an advantageous method of employing a 2:1 superfluity of array elements is described, wherein class-C or saturated amplifiers could be employed while linearly amplifying a plurality of beam signals. Thus, there can be good reasons to prefer a greater number of phase and amplitude controlled elements provided the feeder link bandwidth can be made available for their control.

An alternative to using the feeder link bandwidth for array control from the ground is, of course, to employ beamforming networks or processors on board the satellite. However, the complexity of these devices is high and it is undesirable to determine their performance and characteristics before launch of the satellite that has to serve for ten years in orbit and thus perhaps to preclude the use of future advances in array theory. Nevertheless, it is considered within the scope of the present invention to employ on-board beamforming devices to generate inner and outer array element signals for use according to the present invention.

Figure 7:
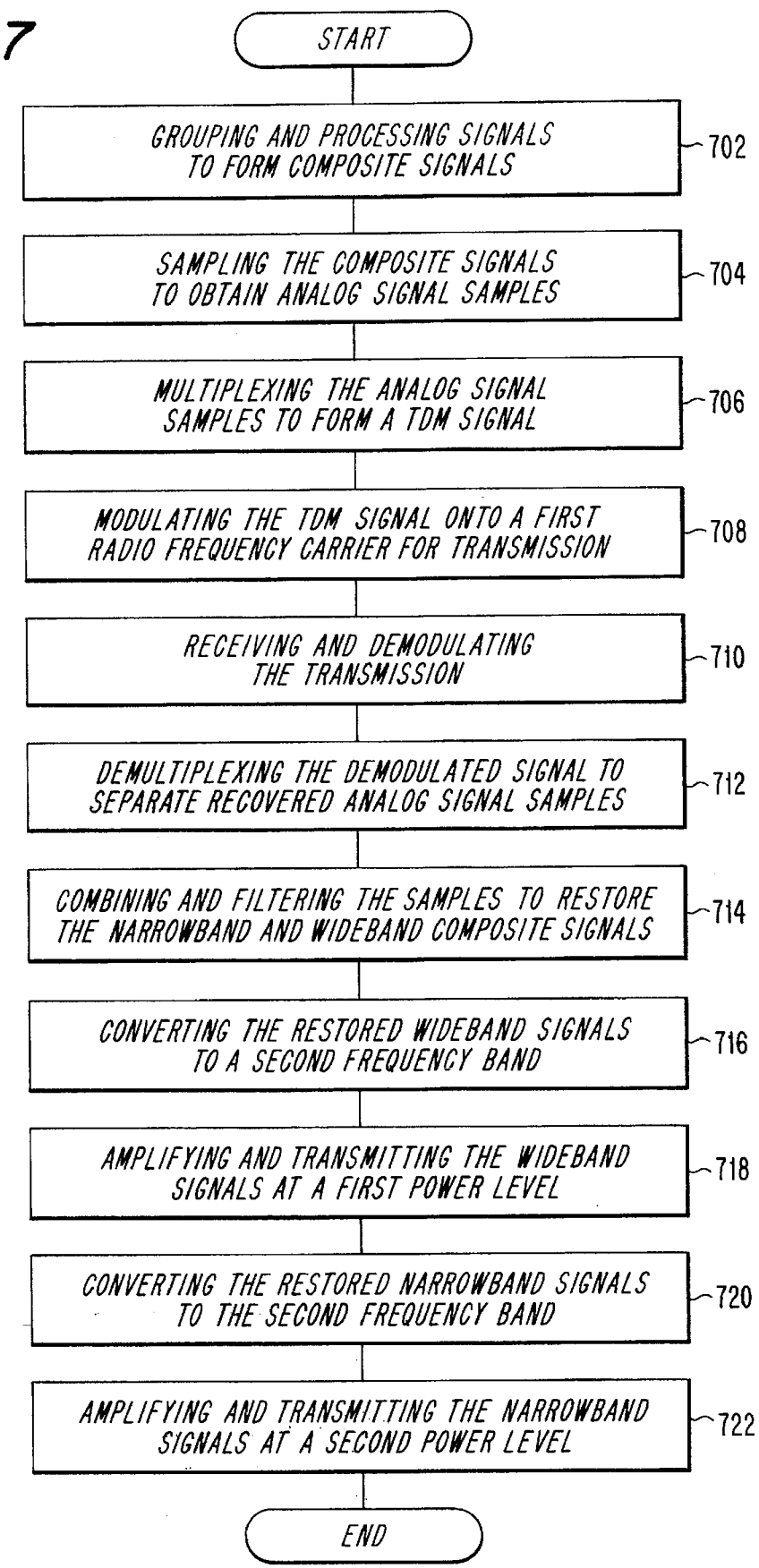
FIG. 7 illustrates a flow chart according to one embodiment of the present invention.

A multi-channel transponding method for relaying signals from a ground station to a plurality of mobile stations using an antenna array is described with reference to FIG. 7. First, the signals are grouped at the ground station to be transponded to mobile stations according to the locations of the mobile stations, in step 702. Then, the signals are processed to form composite signals. The composite signals are then sampled to obtain a plurality of analog signal samples wherein the composite signals which have a wider bandwidth are sampled more often to produce more samples than composite signals which have a narrower bandwidth, in step 704. The analog signal samples are then multiplexed, in step 706, with at least one known predetermined sample to form a time-division-multiplexed signal. The time-division-multiplexed signal is then modulated onto a first radio frequency carrier for transmission from the first station to a relay station in step 708. When the radio transmission is received at the relay station, the relay station demodulates the transmission to recover the time-division-multiplexed signal in step 710. The demodulated signal is then demultiplexed in step 712 to separate recovered analog signal samples, wherein recovered predetermined symbols are used to control the demultiplexing. The recovered samples corresponding to the same wideband composite signal are combined and then filtered to restore the wideband composite signal in step 714. In addition, the samples corresponding to the narrowband composite signal are filtered to restore the narrowband signals. Then, the restored wideband signals are converted to a second frequency band and then amplified in step 716. The amplified wideband signals are then transmitted in step 718 at a first power level using for each signal a power amplifier connected to a radiating antenna element. In addition, the restored narrowband signals are converted to the second frequency band and then amplified in step 720. Finally, the amplified narrowband signals are transmitted in step 722 at a second power level using for each signal a power amplifier connected to another radiating antenna element.

Figure 8A:
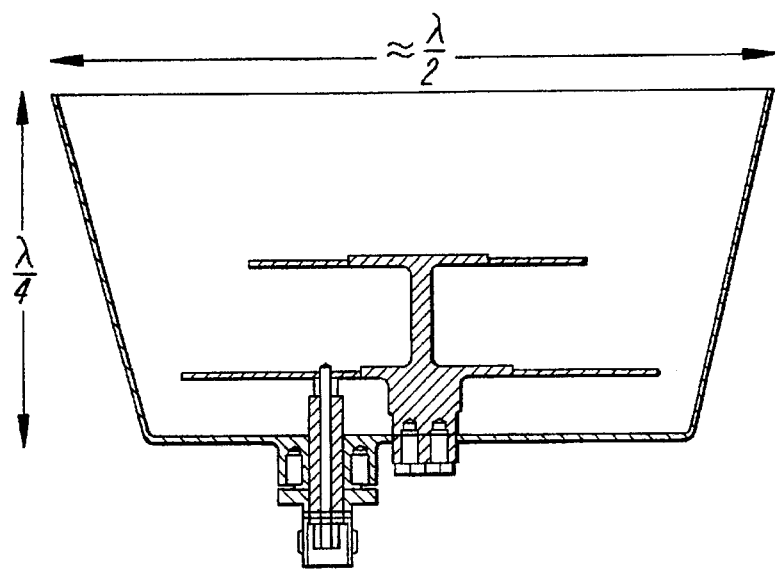
FIGS. 8(a)–(b) illustrate a typical array element and its individual radiation pattern.
Figure 8B:
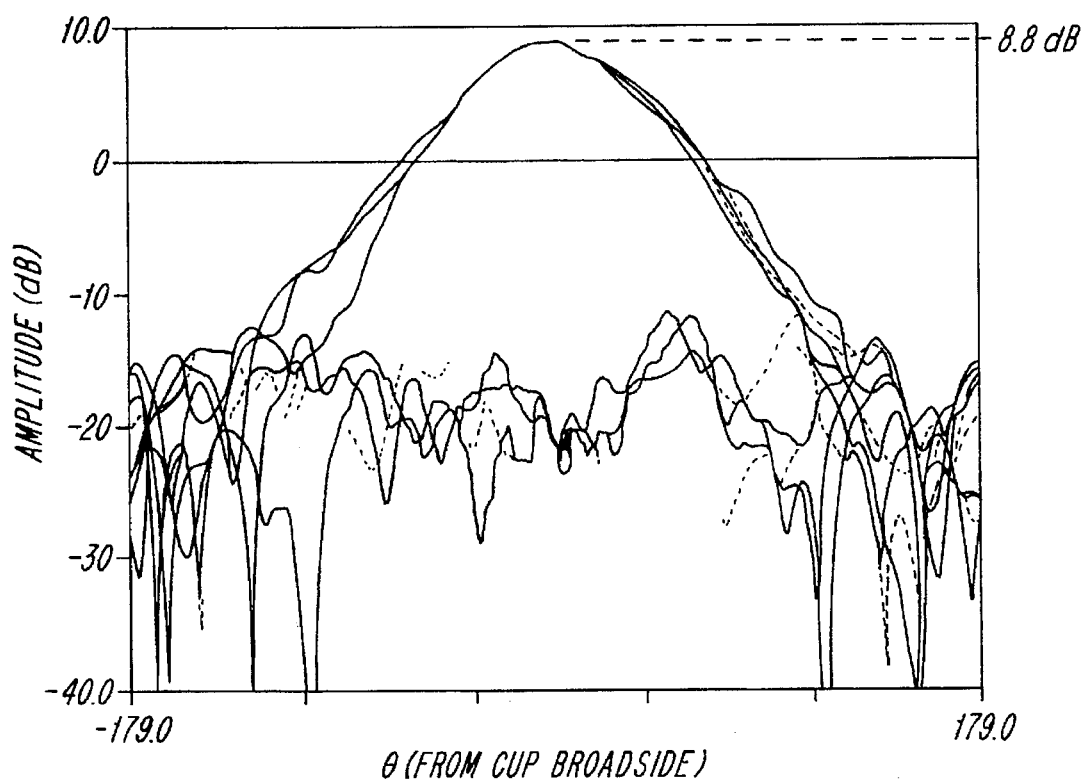

FIGS. 8(a)–(b) illustrate a typical array element and its individual radiation pattern. The peak gain of this array element is about 8.8 dB, and the peak gain of a pattern optimized for coverage down to the 20 degree elevation contour from a 10,000 kM altitude satellite is approximately 14.8 dB. The optimal antenna pattern is determined to be that which has maximum gain at edge of coverage (EOC) i.e., 20 degree elevation contour, and the peak gain is usually 6 dB higher than the EOC gain. Thus, a combination of four of the elements of FIG. 6 in a 2×2 square pattern will form a new element or "sub-array" having 6 dB more gain than a single element. Such sub-arrays can suitably be used as the outer elements of the star pattern array of FIG. 2. Each group subarray is connected to a power amplifier element and quadrature upconverter channel fed from a common local oscillator and the I,Q demultiplexer outputs. The elements of FIG. 6 also simultaneously provide both a RHC and LHC circularly polarized mode, accessible from isolated ports. One polarization may suitably be used for transmitting while the other is used for receiving, easing the avoidance of interference from transmitter elements and receive elements. In analogy with each transmitting subarray input being connected to a power amplifier element, each receive output is connected through a transmitter rejection filter and low noise amplifier to the reverse link array transponder. In the receive direction, inner receiving element signals are processed and then sampled and multiplexed at a higher rate (e.g., 5 MHz) than outer receiving element signals, such that, after they are transponded to the ground station, the ground station may combine inner element signals only in an array signal processor to form coarse receiving beams of wide bandwidth corresponding to the transmit beams, as well as processing all element samples to form narrow receiving beams of a lower bandwidth, corresponding to the narrow transmit beams.

Figure 10:
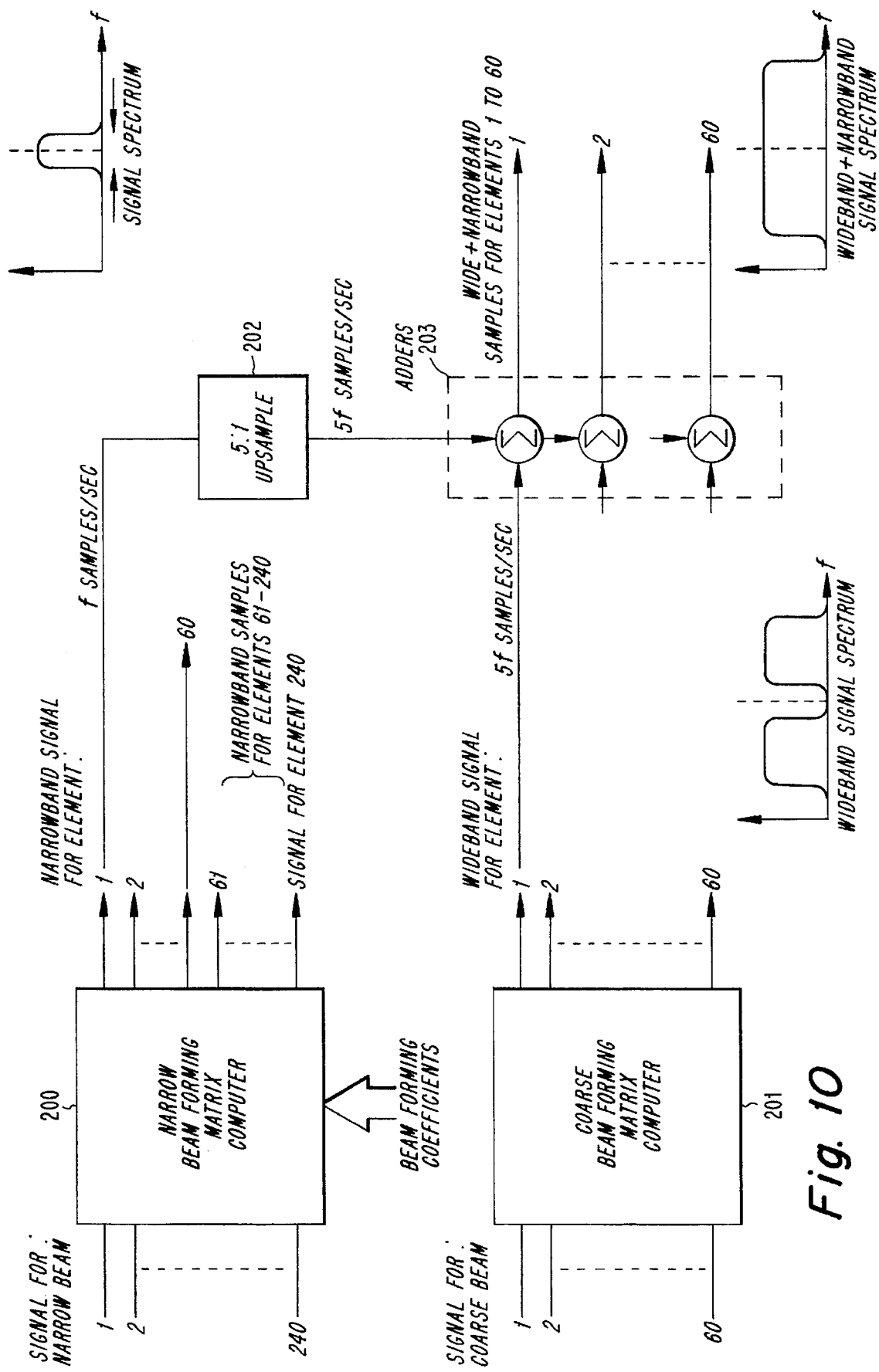
FIG. 10 illustrates a ground station beamforming computer according to one embodiment of the present invention.
Figure 11:
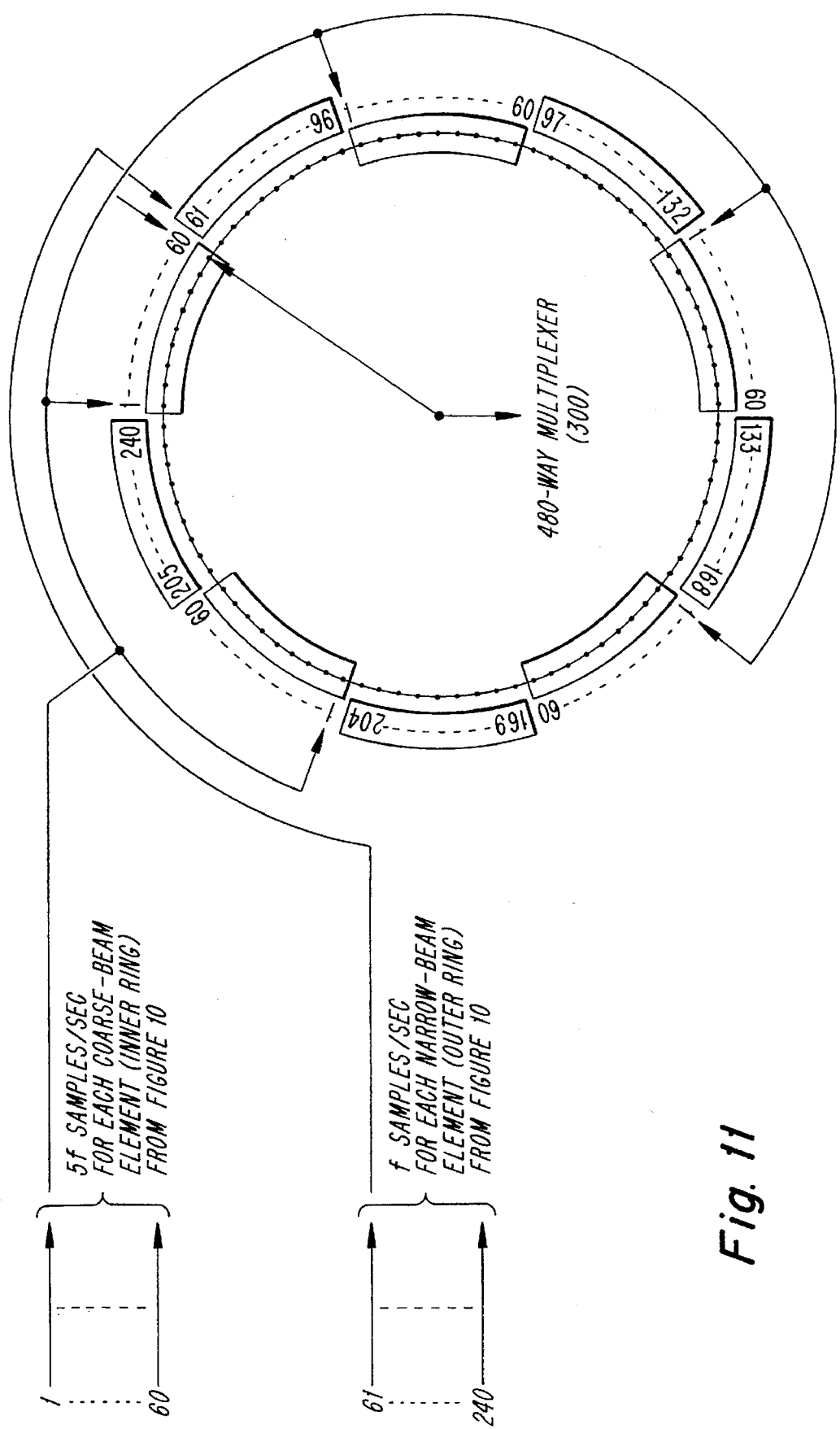
FIG. 11 illustrates a multiple-bandwidth time-division multiplexer feeder link according to one embodiment of the present invention.

A formation at a ground station of the Time-Division-Multiplexed feederlink signal according to one embodiment of the present invention will now be described with reference to FIGS. 10 and 11. Referring to FIG. 10, signals for transmission using the narrow bandwidth, narrow beamwidth beams are applied to a beam forming matrix computer 200. Each of the input signals comprises the sum of signals using different frequencies or timeslots or CDMA codes in the same beam. Different inputs carry similar composite signals for transmission in different beams. The outputs of the beam forming matrix computer 200 comprise linear combinations of the input signals that must be radiated by each array element in order to form the desired directive beams. The beam directions are defined by the beam forming coefficients also supplied to the matrix computer 200. These coefficients can be fixed, defining a fixed set of beams; or can be systematically time-varying according to a clock and an orbital model to form beams that are directed towards fixed points on the earth, thereby compensating for satellite motion; or the coefficients can be time-varying from timeslot to timeslot such that one set of beams is formed for each timeslot, with a relative displacement of the entire beam pattern between different timeslots, or a combination of the above.

The output rate "f" of complex signal samples from each output of the narrow beam forming matrix is at least equal to the per-beam bandwidth in order to satisfy the Nyquist sampling theorem. That is, for a per-beam bandwidth of 1 MHz, each output shall comprise at least 1 million samples/sec. In this example, the beam forming matrix has 240 inputs and calculated drive signals for 240 array elements or subarrays. This is the minimum number of array elements or subarrays necessary to form 240 independent beams.

In parallel, a coarse beam forming matrix computer 201 has a number of inputs for signals to be radiated using wider beamwidth beams. Each input signal in this case comprises a plurality of signals occupying a combined bandwidth that may be wider than the bandwidth of the narrow beams. Furthermore, the spectrum occupied by the wide beams does not overlap that of the narrow beams. This allows the widebeam matrix outputs to be added to the narrowband matrix outputs without interference between their respective signals.

In this example, 60 wide beams are to be formed, and the minimum number of elements for which drive signals have to be formed is thus 60. The bandwidth used for coarse beam signals will be five times that of the narrow beam signals but the center 1/5th of this spectrum is excluded from use in the wide beams because it is already in use in the overlapping narrow beams. Due to the five-fold increase in bandwidth, the sample rate "5 f" output from the coarse beam matrix is five times that of the narrowbeam matrix.

The coarse beams are formed by producing drive signals for array elements 1–60 which form a first radiating aperture. Narrow beams are formed by using all 240 array elements, including elements 1–60. Therefore, elements 1–60 have to be driven with both coarse and narrow beam signals while elements 61–240 are only driven with narrow beam signals. Adders 203 are used to form the sum of wide and narrow drive signals needed for elements 1–60. To combine signals from the narrow beam forming matrix computer 200 at a sampling rate of "f" with signals from the coarse beam forming matrix computer 201 at a sample rate of "5f", an upsampler 202 is used to bring the sample rate "f" of narrow beam signals 1–60 up to the same rate (5f) as the wide beam signals. It is not sufficient to add one sample at rate "f" only to every 5th sample at rate "5g", as the bandwidth that will be imposed for elements 1–60. The upsampler can comprise linear interpolation to solve this problem. In zero-order interpolation, each sample at "f" is merely repeated 5 times. This imposes a $\sin(x)/x$ filter characteristic in the frequency domain having a bandwidth of "f" but also having fairly large sidelobes outside of the bandwidth of "f" and suppressed by only 10 dB approximately. More preferably, the upsampler 202 can perform first order linear interpolation suppressing sidelobes to –19 dB, or still better can use higher order interpolation for further sidelobe suppression. The upsampler 202 can be alternatively described and implemented as a digital filter of either Finite Impulse Response (FIR) form or Infinite Impulse Response (IIR) form, the design of which to accomplish desired frequency response characteristics is well known to the art.

The sum of the wideband and narrowband drive signals at the outputs of the adders 203 now represents the whole "5f" of spectrum using 5f samples per second while drive signals for elements 61–240 is still "f" samples per second. The method of time-multiplexing these different sample rates is illustrated in FIG. 11. The total number of samples to be multiplexed into a TDM frame is 5 samples for each of the elements 1–60 plus one sample for each of the elements 61–240, a total of 480 samples. This is performed by a multiplexer 200. Since the Nyquist sampling theorem applies to samples equispaced in time, each of the five samples for an element such as No. 1 must be evenly distributed through the repetitive TDM frame, which can be regarded as circular. The connections to the multiplexer 200 ensure that each wideband signal 1–60 is sampled at five equispaced points around the circle while narrowband signals are sampled once, using the remaining inputs.

This principle can also be extended to the provision of three or more alternative beamwidths, each beam having an associated bandwidth or spectrum. An exemplary design of a DRA satellite according to FIG. 2 can comprise 31 deployable panels/petals, each bearing 14 active driven elements or subarrays. Corresponding elements on different petals form a ring of 31 elements. The three inner rings of elements can be driven with bandwidth "5f" represented by 5f complex samples/see while the inner five rings, including the first three, are driven by a bandwidth of "3f" samples/sec. The whole 14 rings are driven by a bandwidth of f samples per second. Thus, the inner three rings require "5f" samples/sec; the next two require "3f" samples per second and the remaining nine require samples/sec. The total number of samples to be contained in the TDM frame is thus 3×5+2×3+9=30.

Figure 12:
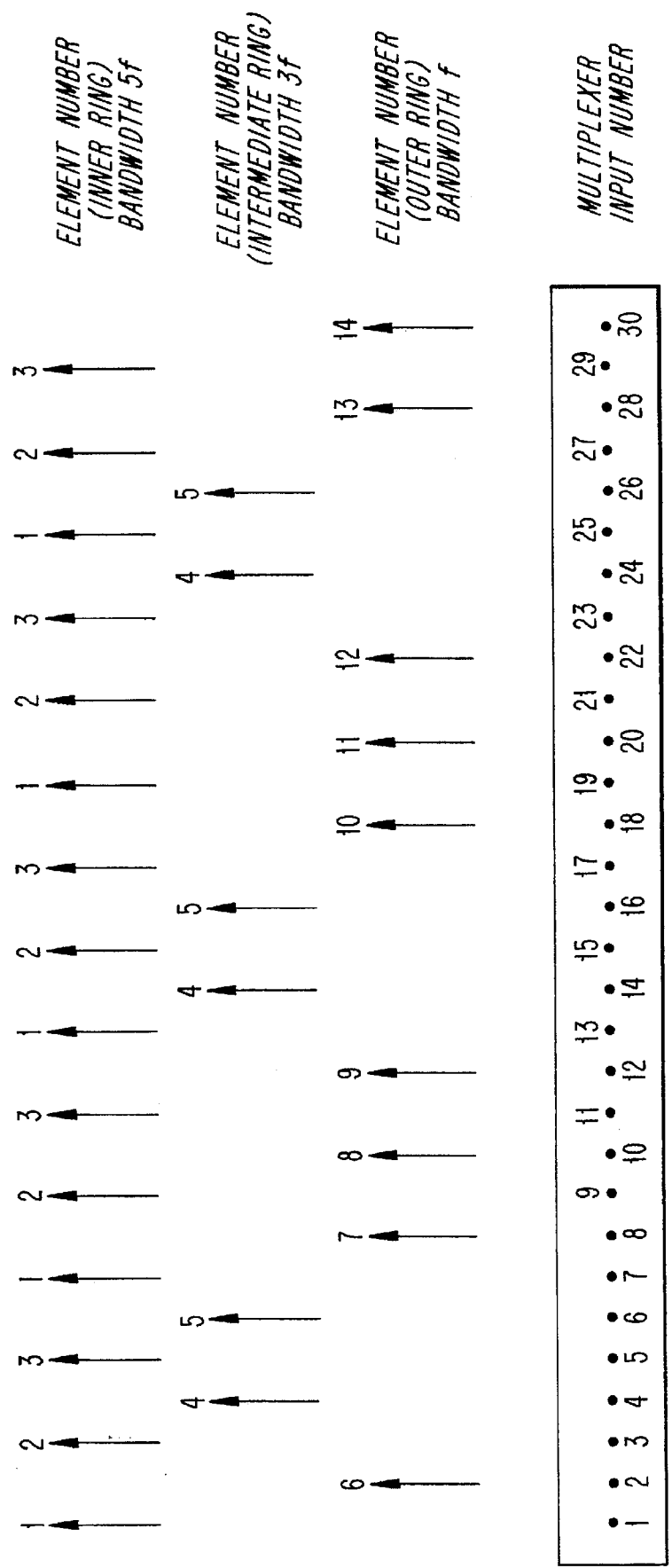
FIG. 12 illustrates the use of 30-way submultiplexer inputs to serve a 14-element array panel with three different signal bandwidths.

FIG. 12 illustrates the connections to a 30-way multiplexer in order to provide 3 signals (1,2,3) that are equisampled five times per frame, two further signals (4,5) that are equisampled three times per frame, and nine signals that are sampled once per frame. It may be reasoned that meeting the equisampling requirements for different rates N1·f, N2·f, N3·f... N3etc. requires a multiplexer having a number of inputs that is a multiple of (N1·N2·N3 ...) This results in the multiplexer for FIG. 12 needing a multiple of 3×5=15 inputs. Since the number of samples per frame for the inner three rings and the intermediate two rings adds up to 21, the choices for the number of multiplexer inputs is in the series 30, 45... etc. The choice of 30 would leave nine remaining inputs sampled at lf, while the choice of 45 leaves 24. The number of elements in the outer ring could thus be 9 or 24.

The multiplex shown in FIG. 12 is constructed by a submultiplexer for each petal. The resulting 31 submultiplex streams are then further combined using a 32-input multiplexer, the 32nd input being used for a known, predetermined sample stream used to assist demultiplexer synchronization, as mentioned above, as well as for automatic gain control and automatic frequency control.

The multiplexing and demultiplexing methods described above are of course equally applicable to the return link for receiving a multiplicity of signals at the satellite from mobile stations and relaying them via a TDM feeder link to a ground station.

To obtain higher power transmission from subarrays in the inner ring, each of the four elements is furnished with its own power amplifier element instead of sharing one. The amplifiers are, however, identical, so that a four times increase in power per inner subarray is achieved compared to the outer subarrays, but using identical amplifiers.

Figure 9:
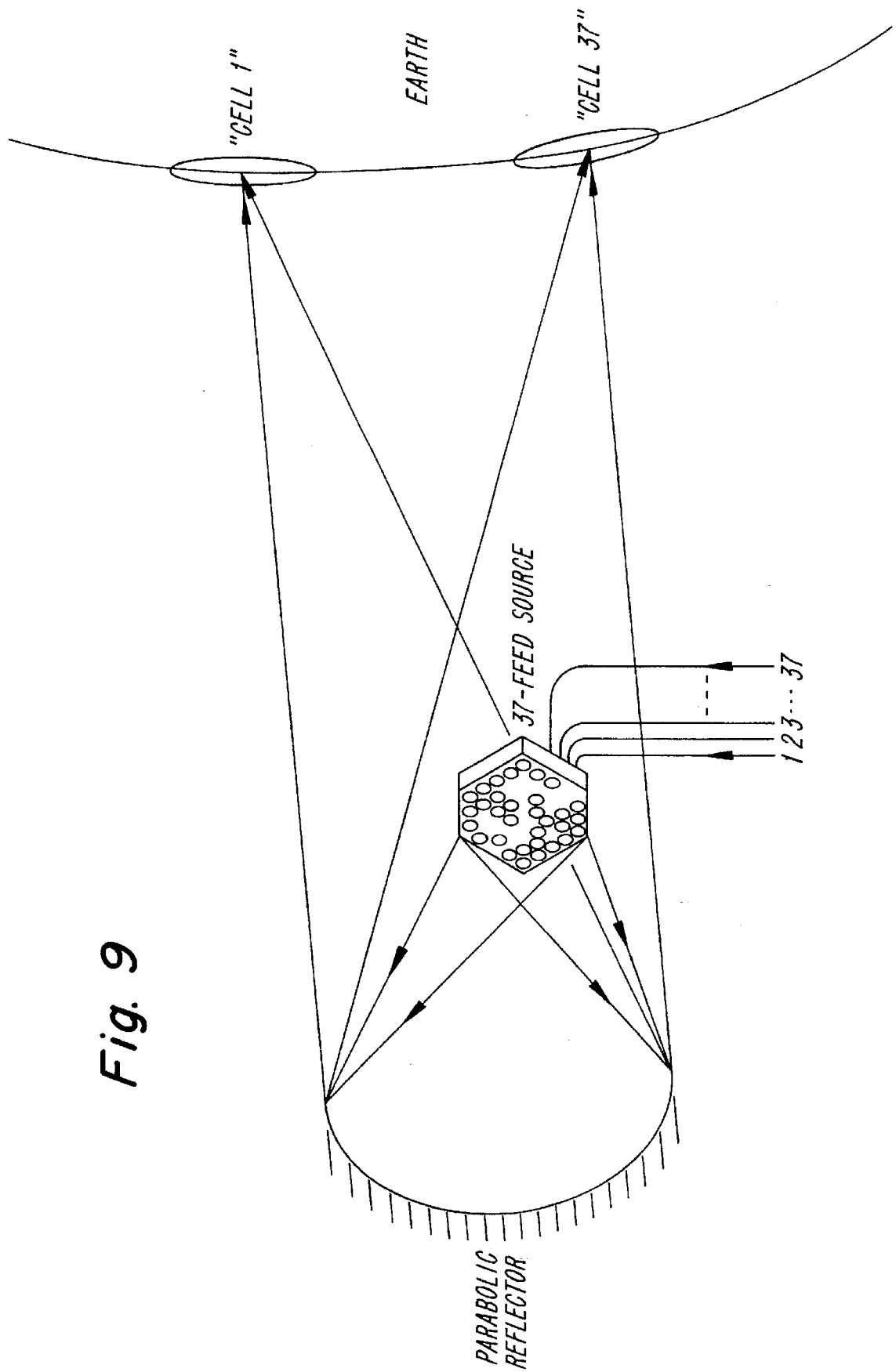
FIG. 9 illustrates a reflecting array configuration according to one embodiment of the present invention.

The present invention may equally be applied to reflecting arrays in which, for example, a parabolic reflector is illuminated by a feed array as illustrated in FIG. 9. An image of the feed array is projected on the earth's surface in which different feeds correspond to different cells or spot beams on the earth. Small feed source array elements thus form small spots (narrow beams), but a large number of feeds are required to ensure the entire earth's surface is covered by one beam or another. Larger feed sources, which can be formed by coherently feeding several smaller sources with the same signal, form larger beams, and a smaller number of such larger sources and beams are required to cover the earth. The present invention encompasses the use of a reflecting array which allocates wider bandwidth to transponder channels driving a reduced number of large feed sources forming coarse beams while allocating a narrower bandwidth to transponder channels driving a larger number of small sources forming narrower beams. Such transponder channels of different bandwidth can be formed by the use of conventional intermediate frequency amplifiers and filters, using up- and down-convertors to translate signals received on one frequency band (the feeder link) from a ground station to another frequency band for driving the reflecting array, and vice-versa for the return link. Such transponder channels of alternate bandwidths can, of course, also be formed using the inventive multiplexing technique described herein in which several multiplexer inputs and corresponding demultiplexer outputs are dedicated to each wide band channel while single multiplexer inputs and outputs are used for narrowband channels.

Of course, the above-described invention may be obviously extended to provide more than two rings of elements of different bandwidth and/or power level, allowing overlapping beam patterns of more than two alternate beamwidths to be created.

All such variations for controlling an antenna array remotely while economizing on control link bandwidth by providing alternative beamwidths, where more spectrum is allocated for use in the wider beamwidths and less in the narrower beamwidths, are considered to be within the scope and spirit of the present invention as described by the following claims.

What is claimed is:

1. A system for wireless communication between at least one first station and a plurality of second stations using a relay station, said relay station comprising:

an antenna array having a plurality of antenna elements divided into at least a first set and a second set, said first set being used to provide transmission or reception using beams having a first beamwidth and said second set being used to provide transmission or reception using beams having a second beamwidth, said first beamwidth being greater than said second beamwidth; and a multi-channel transponder means, connected to said antenna array and to a feeder link antenna, for receiving feeder link signals from said at least one first station and converting said signals into drive signals for said antenna array elements, wherein said multi-channel transponder means uses a first channel bandwidth for transponding signals to be transmitted using said first beamwidth and a second channel bandwidth for transponding signals to be transmitted using said second beamwidth, said first channel bandwidth being greater than said second channel bandwidth.

2. A communications system according to claim 1, wherein said antenna array is a direct radiating phased array.

3. A communications system according to claim 1, wherein said antenna array is a reflecting array comprising an array of feed sources illuminating a reflective surface.

4. A communications system according to claim 3, wherein said feed sources are driven in groups with wideband composite drive signals and said feed sources are driven individually with narrowband drive signals.

5. A communications system according to claim 4, wherein said wideband and narrowband drive signals for driving any particular feed source are summed prior to amplification in an associated power amplifier channel.

6. A communications system according to claim 5, wherein said power amplifier channel is formed between an input to an input combining network for a matrix power amplifier and an output of an output combining network for said matrix power amplifier.

7. A communications system according to claim 1, wherein antenna elements in said first and second sets are divided into subarrays.

8. A communications system according to claim 1, wherein said first and second beamwidths overlap.

9. A communications system according to claim 1, wherein said first and second beamwidths are separate beamwidths.

10. A communications system according to claim 1, wherein said first set of antenna elements includes at least some elements of said second set of antenna elements as a subset.

11. A communications system according to claim 1, wherein said second set of antenna elements includes at least some of said first set of antenna elements as a subset.

12. A multi-channel transponding method for relaying signals from a first station to a plurality of second stations using an antenna array, comprising the steps of:

grouping signals at said first station to be transponded to second stations according to locations of said second stations and processing said signals to form composite signals;

sampling said composite signals to obtain a plurality of analog signal samples wherein composite signals having a wider bandwidth are sampled more often to produce more samples than composite signals having a narrower bandwidth;

multiplexing said analog signal samples with at least one known predetermined sample to form a time-division-multiplexed signal;

modulating said time-division-multiplexed signal onto a first radio frequency carrier for transmission from said first station to a relay station;

receiving said modulated first radio frequency carrier at said relay station and demodulating said transmission to recover said time-division-multiplexed signal;

demultiplexing said demodulated signal to separate recovered analog signal samples, wherein recovered predetermined symbols are used to control said demultiplexing;

for each of said wideband signals, combining recovered samples corresponding to the same wideband composite signal and filtering said samples to restore said wideband composite signal;

filtering samples corresponding to each of said narrowband composite signal to restore said narrowband signals;

converting said restored wideband signals to a second frequency band and amplifying said wideband signals;

transmitting said amplified wideband signals at a first power level using for each signal a power amplifier connected to a radiating antenna element;

converting said restored narrowband signals to said second frequency band and amplifying said narrowband signals; and transmitting said amplified narrowband signals at a second power level using for each signal a power amplifier connected to a radiating antenna element.

13. A method according to claim 12, wherein said antenna army is a direct radiating phased array.

14. A method according to claim 12, wherein said antenna array is a reflecting array comprising an array of feed sources illuminating a reflective surface.

15. A method system according to claim 14, wherein said feed sources are driven in groups with wideband composite drive signals and said feed sources are driven individually with narrowband drive signals.

16. A method according to claim 12, wherein said step of grouping signals comprises modulating each signal in a group onto a separate frequency channel by frequency-division-multiplexing said signals.

17. A method according to claim 12, wherein said step of grouping signals comprises modulating at least some signals in a group onto the same frequency channel by time-division-multiplexing said signals.

18. A method according to claim 12, wherein said step of grouping signals comprises modulating at least some signals in a group onto the same frequency channel by time-division-multiplexing said signals and another set of signals in the same group onto a different frequency channel by time-division-multiplexing.

19. A method according to claim 12, wherein said step of grouping signals comprises modulating each signal in a group using a separate CDMA code on the same frequency channel and forming a weighted sum of each signal.

20. A method according to claim 12, wherein said processing to form said composite signals comprises digital beam forming.

21. A system for wireless communication between one or more first stations and a large plurality of second stations using a relay station, said relay station comprising:
an antenna array having a plurality of antenna elements divided into at least a first set and a second set, said first set being used to provide transmission or reception using beams having a first beamwidth and said second set being used to provide transmission or reception using beams having a second beamwidth; and
a multi-channel transponder means, connected to said antenna array and to a feeder link antenna, for receiving signals from said second stations using said antenna array and processing and combining said signals to obtain a signal for transmission to said first stations using said feeder link antenna, wherein said multi-channel transponder uses a first channel bandwidth for transponding signals received using said first set of antenna elements and a second channel bandwidth for transponding signals received using said second set of antenna elements.

22. A system according to claim 21, wherein said second set of antenna elements includes said first set.

23. A communications system according to claim 21, wherein said antenna array is a direct radiating phased array.

24. A communications system according to claim 21, wherein said antenna array is a reflecting array comprising an array of feed sources illuminating a reflective surface.

25. A communications system according to claim 24, wherein said feed sources are driven in groups with wideband composite drive signals and said feed sources are driven individually with narrowband drive signals.

26. A communications system according to claim 25, wherein said wideband and narrowband drive signals for driving any particular feed source are summed prior to amplification in an associated power amplifier channel.

27. A communications system according to claim 26, wherein said power amplifier channel is formed between an input of an input combining network for a matrix power amplifier and an output of an output combining network for said matrix power amplifier.

28. A communications system according to claim 21, wherein antenna elements in said first and second sets are divided into subarrays.

29. A communications system according to claim 21, wherein said first and second beamwidths overlap.

30. A communications system according to claim 21, wherein said first and second beamwidths are separate beamwidths.

31. A multi-channel transponding method for relaying signals from a plurality of second stations to a first station using an antenna array, comprising the steps of:
receiving first signals using each of a first set of antenna elements;
processing said received first signals using associated transponder channels of a first bandwidth and sampling said processed signals at a first sampling rate to produce a first sample stream corresponding to each channel;
receiving second signals using each of a second set of antenna elements;
processing said received second signals using associated transponder channels of a second bandwidth and sampling said second signals at a second sampling rate to produce a second sample stream corresponding to each channel;
multiplexing said first and second sample streams with at least one known predetermined sample stream to form a time-division-multiplexed signal;
modulating said time-division-multiplexed signal onto a feeder link radio carrier frequency for transmission to said first station;
receiving said modulated feeder link radio frequency carrier at said first station and demodulating it to recover said time-division-multiplexed signal;
demultiplexing said demodulated signal to separate said recovered sample streams including said at least one predetermined sample stream and using said recovered predetermined sample stream to control said demultiplexing;
processing said recovered sample streams to separate signals from different second stations; and
sending said separated signals to a switched telephone transmission network.

32. A system according to claim 1, wherein said second set of antenna elements includes said first set.

33. A method according to claim 31, wherein said antenna array is a direct radiating phased array.

34. A method according to claim 31, wherein said antenna array is a reflecting array comprising an array of feed sources illuminating a reflective surface.

35. A method system according to claim 34, wherein said feed sources are driven in groups with wideband composite drive signals and said feed sources are driven individually with narrowband drive signals.

36. A method system according to claim 35, wherein said wideband and narrowband drive signals for driving any particular feed source are summed prior to amplification in an associated power amplifier channel.

37. A method system according to claim 36, wherein said power amplifier channel is formed between an input to an input combining network for a matrix power amplifier and an output of an output combining network for said matrix power amplifier.

38. A method according to claim 31, wherein each signal in a group is modulated onto a separate frequency channel by frequency-division-multiplexing said signals.

39. A method according to claim 31, wherein at least some signals in a group are modulated onto the same frequency channel by time-division-multiplexing said signals.

40. A method according to claim 31, wherein at least some signals in a group are modulated onto the same frequency channel by time-division-multiplexing said signals and another set of signals in the same group onto a different frequency channel by time-division-multiplexing.

41. A method according to claim 31, wherein each signal in a group is modulated using a separate CDMA code on the same frequency channel and forming a weighted sum of each signal.

42. A method according to claim 31, wherein said processing to form composite signals comprises digital beam forming.

43. A method system according to claim 15, wherein said wideband and narrowband drive signals for driving any particular feed source are summed prior to amplification in an associated power amplifier channel.

44. A method system according to claim 43, wherein said power amplifier channel is formed between an input of an input combining network for a matrix power amplifier and an output of an output combining network for said matrix power amplifier.

\* \* \* \* \*